US012643366B1

(12) United States Patent
Tebbe et al.

(10) Patent No.: US 12,643,366 B1
(45) Date of Patent: Jun. 2, 2026

(54) SUSPENSION SYSTEM WITH VARIABLE DAMPING

(71) Applicant: Deere & Company, Moline, IL (US)

(72) Inventors: Scott A. Tebbe, Cedar Falls, IA (US);
Jade E. Bender, Waterloo, IA (US);
Curtis P. Thoreson, Janesville, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 19/268,395

(22) Filed: Jul. 14, 2025

Related U.S. Application Data

(60) Provisional application No. 63/795,396, filed on Apr. 26, 2025.

(51) Int. Cl.
| | |
|---|---|
| *B60G 17/08* | (2006.01) |
| *B60G 13/08* | (2006.01) |
| *B60G 17/015* | (2006.01) |
| *B60G 17/0165* | (2006.01) |

(52) U.S. Cl.
CPC ............. *B60G 17/08* (2013.01); *B60G 13/08* (2013.01); *B60G 17/0152* (2013.01); *B60G 17/0165* (2013.01); *B60G 2202/24* (2013.01); *B60G 2204/62* (2013.01); *B60G 2204/82* (2013.01); *B60G 2204/8304* (2013.01); *B60G 2206/41* (2013.01); *B60G 2500/104* (2013.01); *B60G 2500/114* (2013.01); *B60G 2600/182* (2013.01); *B60G 2800/162* (2013.01); *B60G 2800/916* (2013.01)

(58) Field of Classification Search
CPC .................................................. B60G 2204/82
See application file for complete search history.

(56) References Cited

U.S. PATENT DOCUMENTS

| | | | | |
|---|---|---|---|---|
| 5,144,558 | A | * | 9/1992 | Fukushima .......... B60G 17/016 |
| | | | | 280/5.506 |
| 5,338,010 | A | * | 8/1994 | Haupt .................. B60G 21/073 |
| | | | | 280/6.159 |
| 6,578,855 | B2 | | 6/2003 | Wallestad |
| 6,722,994 | B2 | | 4/2004 | Wayne et al. |

(Continued)

FOREIGN PATENT DOCUMENTS

| | | | | |
|---|---|---|---|---|
| CN | 1971080 | A | * | 5/2007 |
| DE | 102004039973 | A1 | * | 3/2005 ............. B60G 17/04 |

(Continued)

*Primary Examiner* — Nicole T Verley

(57) ABSTRACT

A suspension system for a work vehicle including a first cylinder having a piston side, a second cylinder having a piston side, a first proportional valve having a first position allowing flow between one or more accumulators, the piston side of the first cylinder, and the piston side of the second cylinder, and a second position preventing flow between the one or more accumulators, the piston side of the first cylinder, and the piston side of the second cylinder, and a second proportional valve having a first position allowing flow between a first accumulator and the piston side of the first cylinder and allowing flow between a second accumulator and the piston side of the second cylinder, and a second position preventing flow between the first accumulator and the piston side of the first cylinder and preventing flow between the second accumulator and the piston side of the second cylinder.

16 Claims, 11 Drawing Sheets

(56) References Cited

U.S. PATENT DOCUMENTS

| | | | | |
|---|---|---|---|---|
| 6,782,697 | B2 * | 8/2004 | Mather | F15B 13/0417 |
| | | | | 91/445 |
| 6,786,492 | B2 * | 9/2004 | Brandenburger | B60G 17/0408 |
| | | | | 280/124.159 |
| 7,048,280 | B2 * | 5/2006 | Brandenburger | B60G 17/056 |
| | | | | 280/6.159 |
| 7,055,831 | B2 * | 6/2006 | Brandenburger | B60G 21/073 |
| | | | | 280/124.159 |
| 7,192,034 | B2 | 3/2007 | Radke et al. | |
| 7,584,812 | B2 | 9/2009 | Radke et al. | |
| 7,735,838 | B2 * | 6/2010 | Rades | B60G 21/106 |
| | | | | 280/5.507 |
| 8,065,054 | B2 | 11/2011 | Tarasinski et al. | |
| 9,428,025 | B2 | 8/2016 | Foxen et al. | |
| 10,556,478 | B2 | 2/2020 | Ballaire | |
| 11,059,339 | B2 | 7/2021 | Zwanzger et al. | |
| 11,358,430 | B2 | 6/2022 | Tebbe et al. | |
| 11,685,218 | B2 | 6/2023 | Benevelli et al. | |
| 12,023,978 | B2 | 7/2024 | Benevelli et al. | |
| 2010/0044976 | A1 * | 2/2010 | Rades | B60G 21/106 |
| | | | | 280/5.507 |
| 2011/0098885 | A1 * | 4/2011 | Iwami | B60G 17/0152 |
| | | | | 701/37 |
| 2022/0032719 | A1 * | 2/2022 | Benevelli | B60G 13/08 |

FOREIGN PATENT DOCUMENTS

| | | | | |
|---|---|---|---|---|
| DE | 102019131201 | A1 * | 5/2021 | B60G 17/08 |
| DE | 102020001713 | A1 * | 9/2021 | B60G 11/265 |
| DE | 102021004608 | A1 * | 3/2023 | E02F 9/2228 |
| DE | 102021004612 | A1 * | 3/2023 | E02F 9/2207 |
| EP | 0326180 | B1 * | 9/1993 | B60G 17/0163 |
| EP | 0980772 | A2 * | 2/2000 | B60G 17/0162 |
| EP | 3330111 | B1 * | 2/2023 | B60G 17/0416 |
| GB | 2564763 | A * | 1/2019 | F15B 13/028 |
| IT | 201900010992 | A1 * | 1/2021 | B60G 11/265 |
| WO | WO-2021180463 | A1 * | 9/2021 | B60G 11/265 |

* cited by examiner

SUSPENSION SYSTEM WITH VARIABLE DAMPING

CROSS-REFERENCE TO RELATED APPLICATIONS

This application claims the benefit of U.S. Provisional Application No. 63/795,396, filed Apr. 26, 2025, which is hereby incorporated by reference in its entirety.

FIELD OF THE DISCLOSURE

The present disclosure relates to a suspension system with variable damping for a work vehicle.

BACKGROUND

Suspension systems are used in work vehicles to provide relative movement between two or more components. Suspension systems can provide relative movement between an axle and a frame or chassis of a work vehicle. Suspension systems can provide relative movement between an operator station and a frame or chassis of a work vehicle.

SUMMARY

According to an aspect of the present disclosure, a suspension system for a work vehicle includes a first cylinder having a piston side and a rod side, the first cylinder connected between a chassis and an axle assembly on a right side of the work vehicle, a second cylinder having a piston side and a rod side, the second cylinder connected between the chassis and the axle assembly on a left side of the work vehicle, a first proportional valve having a first position allowing flow between one or more accumulators, the piston side of the first cylinder, and the piston side of the second cylinder, and a second position preventing flow between the one or more accumulators, the piston side of the first cylinder, and the piston side of the second cylinder, and a second proportional valve having a first position allowing flow between a first accumulator and the piston side of the first cylinder and allowing flow between a second accumulator and the piston side of the second cylinder, and a second position preventing flow between the first accumulator and the piston side of the first cylinder and preventing flow between the second accumulator and the piston side of the second cylinder.

According to an aspect of the present disclosure, the suspension system further includes a valve selectively providing pilot pressure to the first and second proportional valves.

According to an aspect of the present disclosure, the first proportional valve includes a first spring having a first spring constant providing a force on the first proportional valve towards the first position.

According to an aspect of the present disclosure, the second proportional valve includes a second spring having a second spring constant providing a force on the second proportional valve towards the first position.

According to an aspect of the present disclosure, the first spring constant is less than the second spring constant, such that the pilot pressure causes the first proportional valve to move towards the second position before the second proportional valve.

According to an aspect of the present disclosure, the second proportional valve has a third position allowing flow between the piston sides of first and second cylinders, preventing flow between the first accumulator and the piston side of the first cylinder, and preventing flow between the second accumulator and the piston side of the second cylinder.

According to an aspect of the present disclosure, the rod sides of the first and second cylinders are connected to each other and to a third accumulator.

According to an aspect of the present disclosure, a system for varying the damping of a suspension system for a work vehicle includes a first cylinder having a piston side and a rod side, the first cylinder connected between a chassis and an axle assembly on a right side of the work vehicle, a second cylinder having a piston side and a rod side, the second cylinder connected between the chassis and the axle assembly on a left side of the work vehicle, a first proportional valve having a first position allowing flow between one or more accumulators, the piston side of the first cylinder, and the piston side of the second cylinder, and a second position preventing flow between the one or more accumulators, the piston side of the first cylinder, and the piston side of the second cylinder, a second proportional valve having a first position allowing flow between a first accumulator and the piston side of the first cylinder and allowing flow between a second accumulator and the piston side of the second cylinder, and a second position preventing flow between the first accumulator and the piston side of the first cylinder and preventing flow between the second accumulator and the piston side of the second cylinder, and a controller configured to vary the damping of the suspension system by adjusting pilot pressure provided to the first and second proportional valves.

According to an aspect of the present disclosure, the system further includes a valve selectively providing pilot pressure to the first and second proportional valves, the controller configured to adjust the valve varying the pilot pressure provided to the first and second proportional valves.

According to an aspect of the present disclosure, the controller is configured to adjust the valve varying the pilot pressure provided to the first and second proportional valves to close the first proportional valve and partially close the second proportional valve.

According to an aspect of the present disclosure, the controller is configured to adjust the valve varying the pilot pressure provided to the first and second proportional valves to close the first and second proportional valves.

According to an aspect of the present disclosure, a method for varying the damping of a suspension system for a work vehicle includes adjusting via a controller a first proportional valve between a first position allowing flow between one or more accumulators, a piston side of a first cylinder, and a piston side of a second cylinder, and a second position preventing flow between the one or more accumulators, the piston side of the first cylinder, and the piston side of the second cylinder, and adjusting via the controller a second proportional valve between a first position allowing flow between a first accumulator and the piston side of the first cylinder and allowing flow between a second accumulator and the piston side of the second cylinder, and a second position preventing flow between the first accumulator and the piston side of the first cylinder and preventing flow between the second accumulator and the piston side of the second cylinder.

According to an aspect of the present disclosure, the method further includes adjusting via the controller a valve to vary a pilot pressure provided to the first proportional valve and the second proportional valve.

According to an aspect of the present disclosure, the method further includes adjusting via the controller the valve to vary a pilot pressure provided to the first and second proportional valves to close the first proportional valve and partially close the second proportional valve.

According to an aspect of the present disclosure, the method further includes adjusting via the controller the valve to vary a pilot pressure provided to the first and second proportional valves to close the first and second proportional valves.

The above and other features will become apparent from the following detailed description and accompanying drawings.

BRIEF DESCRIPTION OF THE DRAWINGS

The detailed description refers to the accompanying figures in which.

Like reference numerals are used to indicate like elements throughout the several figures.

DETAILED DESCRIPTION

The embodiments or implementations disclosed in the above drawings and the following detailed description are not intended to be exhaustive or to limit the present disclosure to these embodiments or implementations.

Figure 1:
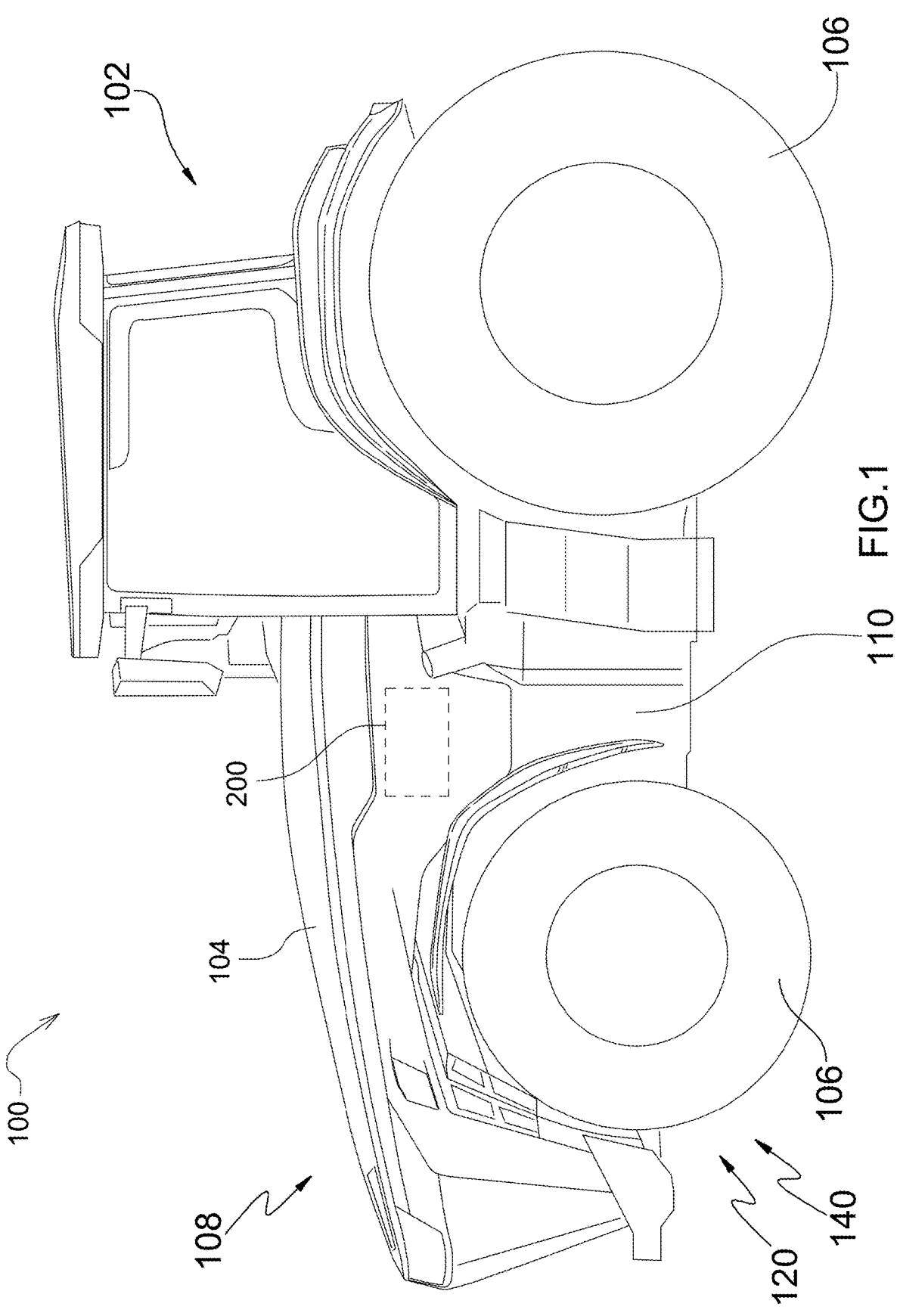
FIG. 1 is a perspective view of a work vehicle including a suspension system, according to an implementation.

With reference to FIG. 1, a work vehicle 100, for example an agricultural tractor, can include a suspension system 140. The present disclosure also applies to other types of work vehicles in agriculture, utility, turf or lawn care, construction, forestry, and road building. The work vehicle 100 can include a frame or chassis 110, an operator station or cab 102, and one or more ground engaging apparatus 106, for example wheels or track assemblies. The tractor 100 can have a rigid or an articulated frame 110. The tractor 100 can include a power source 108 positioned under a covering or hood 104 and a drivetrain transferring power from the power source 108 to the ground engaging apparatus 106 and one or more power take off shafts. The tractor 100 can include an operator interface having any number and combination of electronic devices, such as an interactive display. The work vehicle 100 can include an electronic control unit or controller 200.

Figure 2:
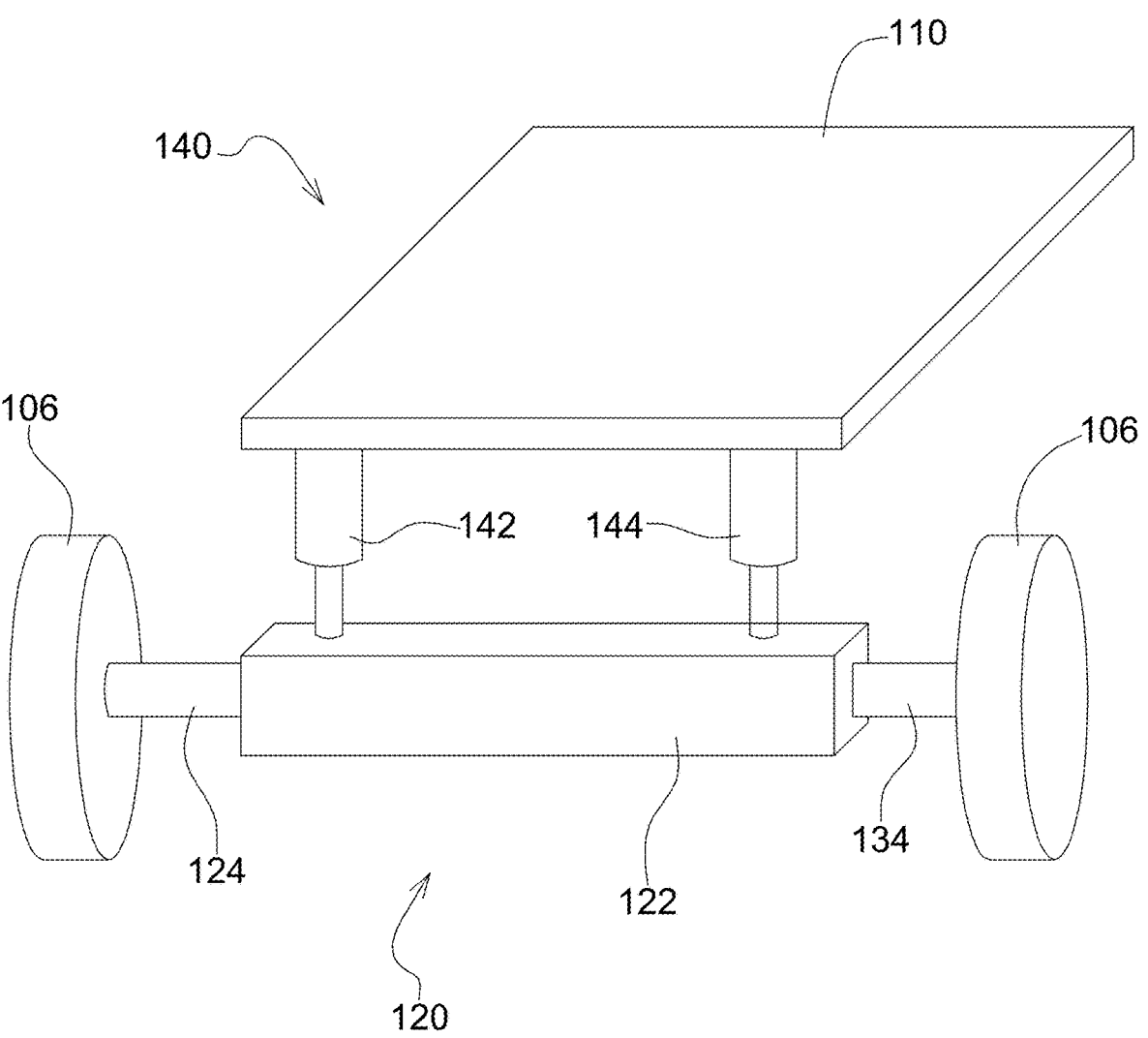
FIG. 2 is a perspective view of a suspension system for a work vehicle, according to an implementation.

With reference to FIG. 2, the work vehicle 100 can include an axle assembly 120 having an axle housing 122 and one or more axles 124 connected to one or more wheels 106. The axle assembly 120 can be a front or rear axle assembly. The suspension system 140 can be positioned between the axle assembly 120 and the frame or chassis 110. The suspension system 140 can include a first cylinder 142 and a second cylinder 144 positioned between the axle assembly 120 and the frame or chassis 110. The first cylinder 142, or right cylinder, can be positioned on the right side of the work vehicle 100 and the second cylinder 144, or left cylinder, can be positioned on the left side of the work vehicle 100. The first and second cylinders 142, 144 can be positioned with the piston side up and the rod side down, or vice versa. The first and second cylinders 142, 144 can be single or double-acting pneumatic or hydraulic cylinders.

Figure 3:
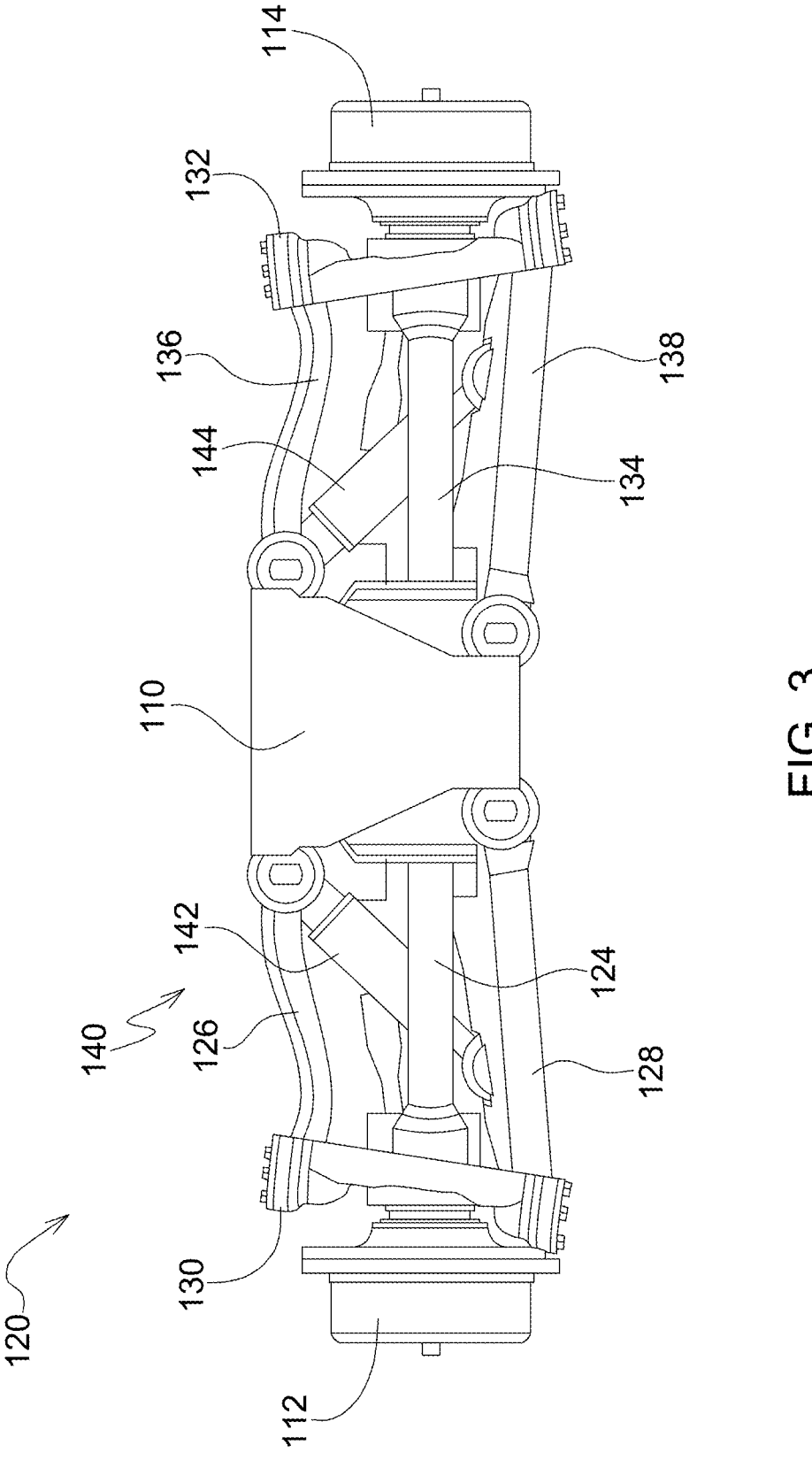
FIG. 3 is a perspective view of a suspension system for a work vehicle, according to an implementation.
Figure 4:
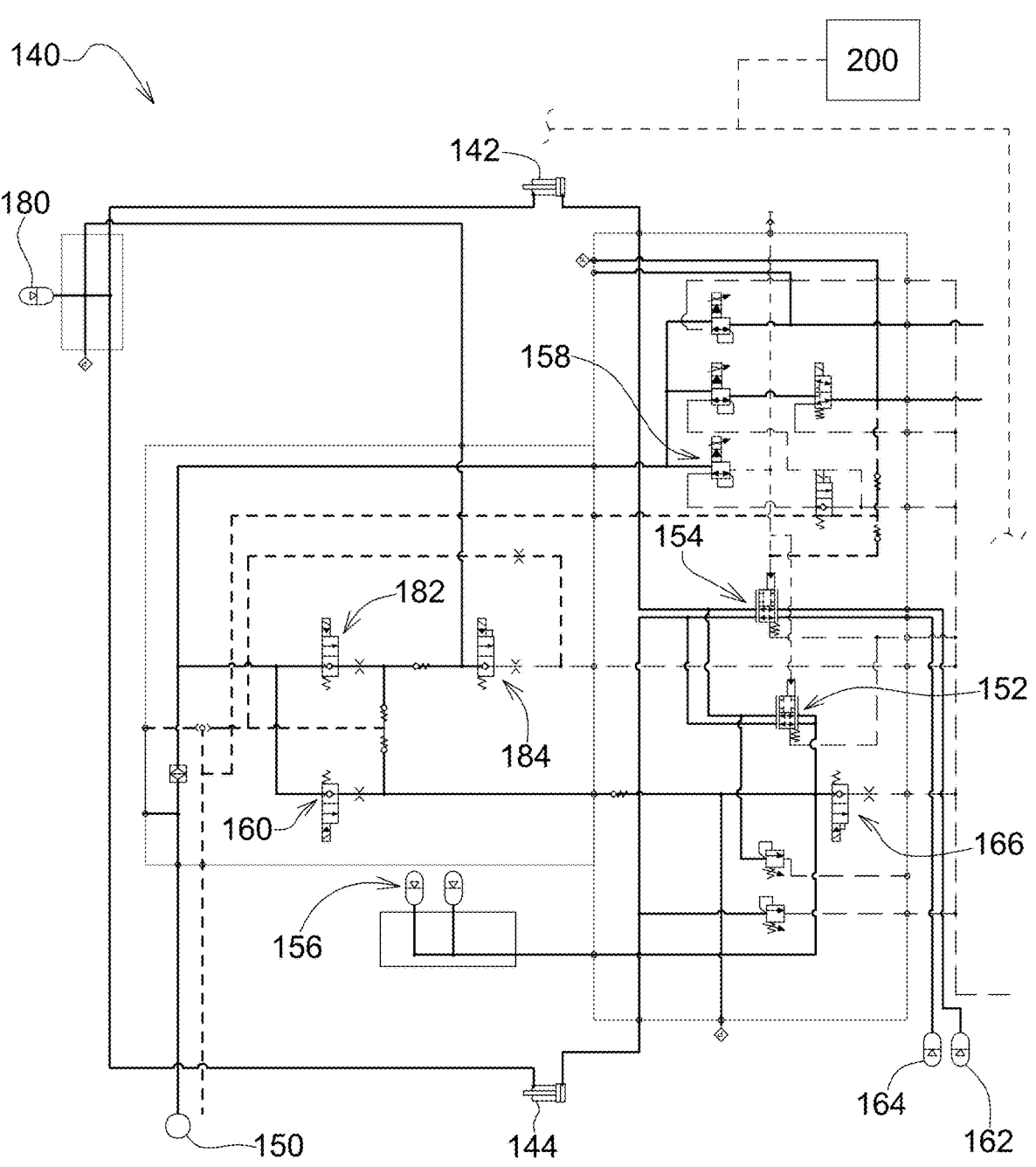
FIG. 4 is a schematic diagram of a suspension system for a work vehicle, according to an implementation.
Figure 5:
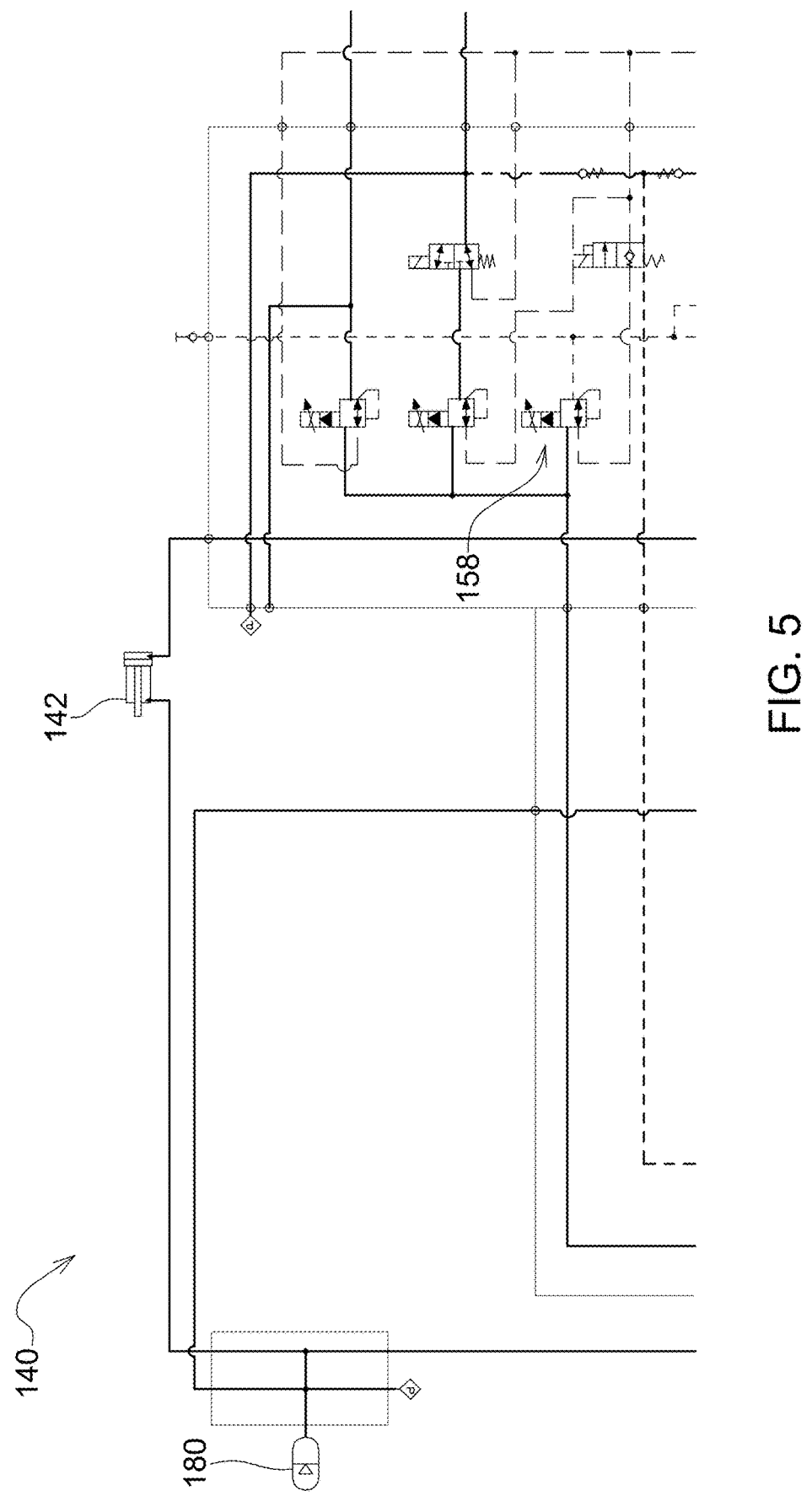
FIG. 5 is a detail view of the schematic diagram in FIG. 4, according to an implementation.
Figure 6:
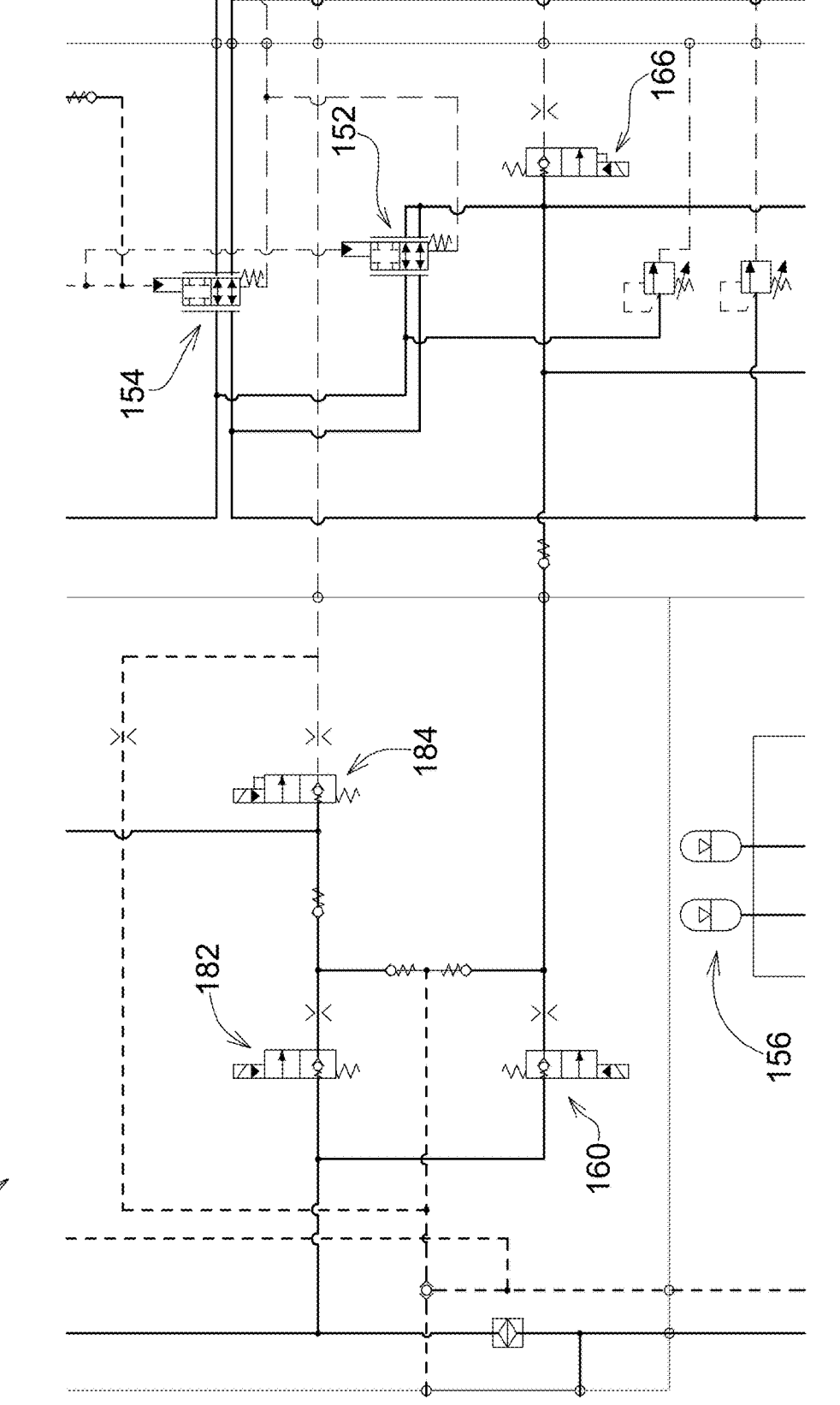
FIG. 6 is a detail view of the schematic diagram in FIG. 4, according to an implementation.
Figure 7:
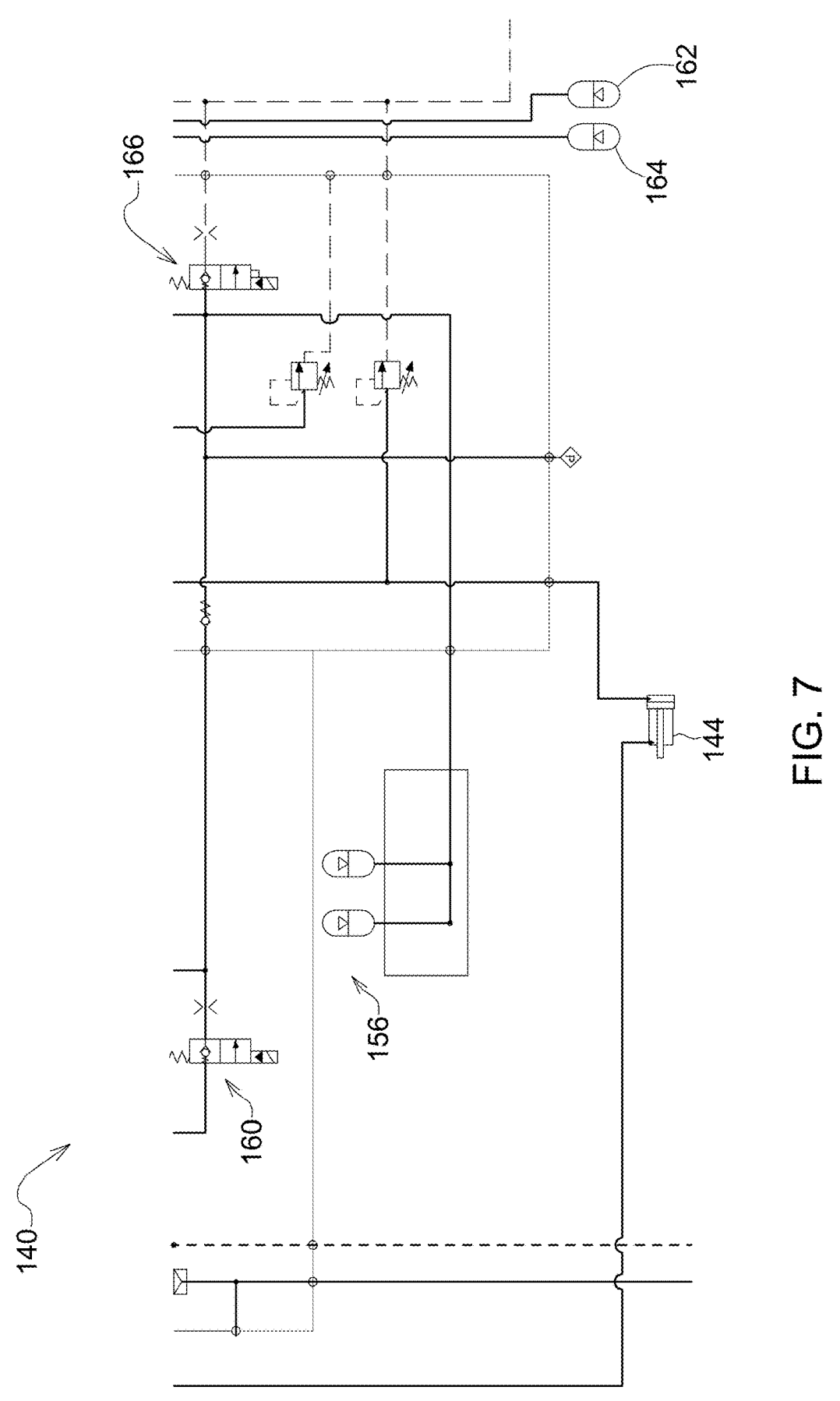
FIG. 7 is a detail view of the schematic diagram in FIG. 4, according to an implementation.
Figure 8:
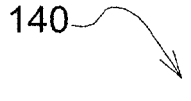
FIG. 8 is a detail view of the schematic diagram in FIG. 4, according to an implementation.
Figure 9:
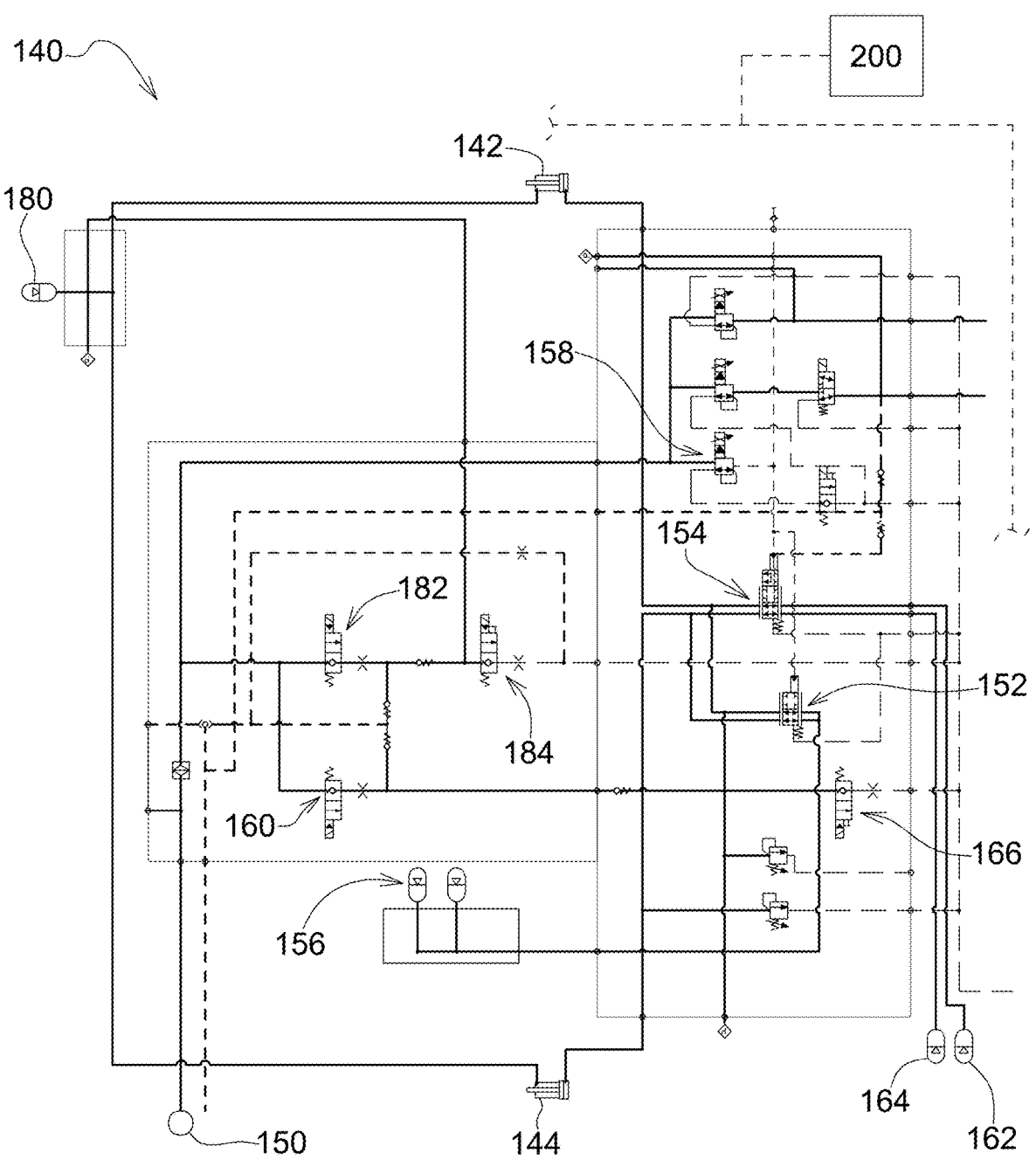
FIG. 9 is a schematic diagram of a suspension system for a work vehicle, according to an implementation.
Figure 10:
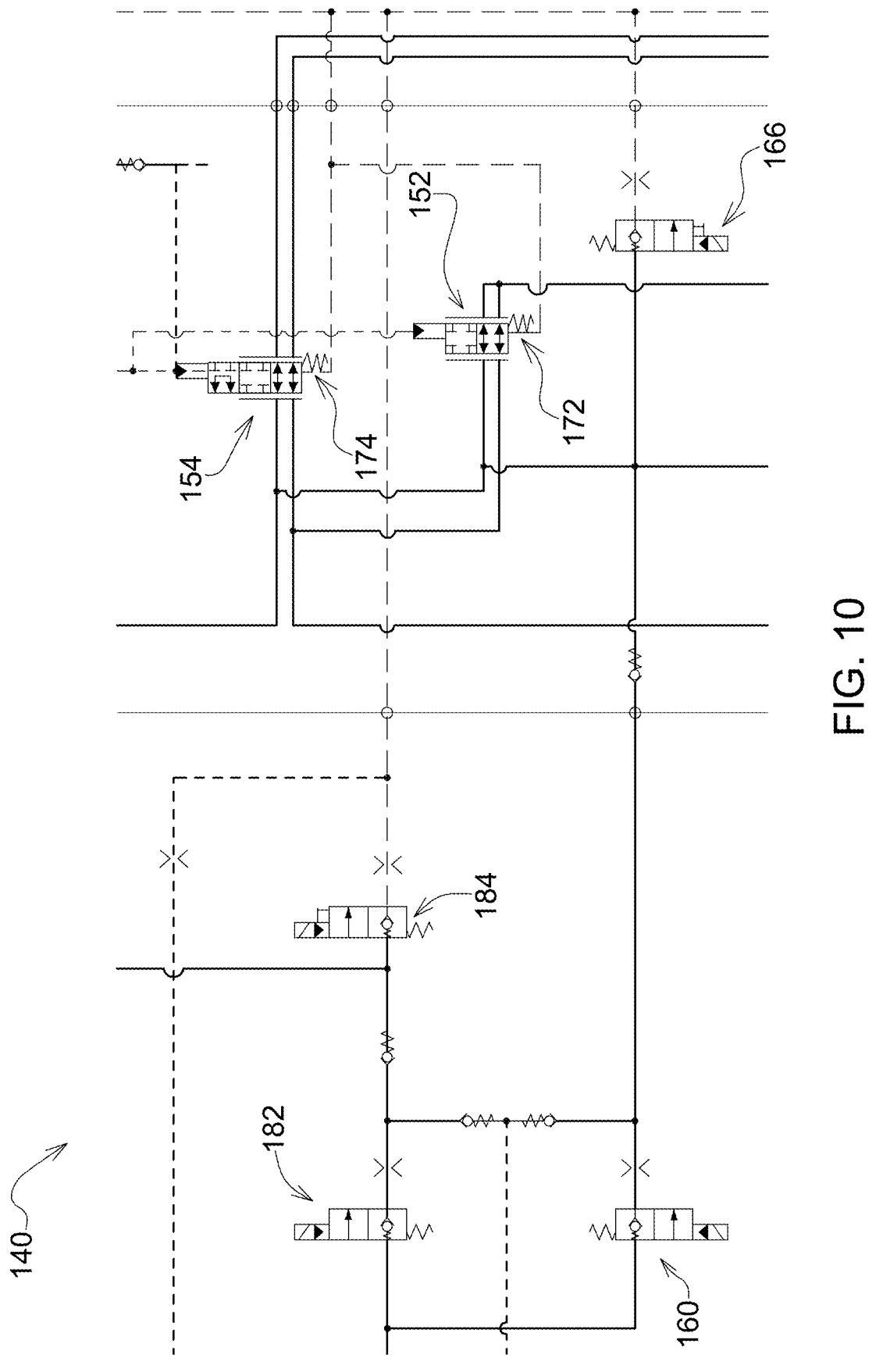
FIG. 10 is a detail view of the schematic diagram in FIG. 9, according to an implementation.

With reference to FIG. 3, a front axle assembly 120 includes right and left upper control arms 126, 136, right and left lower control arms 128, 138, right and left axles or axle shafts 124, 134, and right and left wheel hubs 112, 114. The right upper control arm 126 rotatably connects to the frame or chassis 110 at one end and rotatably connects the right steering knuckle 130 at the other end. The right lower control arm 128 rotatably connects to the frame or chassis 110 at one end and rotatably connects the right steering knuckle 130 at the other end. The left upper control arm 136 rotatably connects to the frame or chassis 110 at one end and rotatably connects the left steering knuckle 132 at the other end. The left lower control arm 138 rotatably connects to the frame or chassis 110 at one end and rotatably connects the left steering knuckle 132 at the other end. The right cylinder 142 rotatably connects to the frame or chassis 110 at one end and rotatably connects to the right lower control arm 128 at the other end. The left cylinder 144 rotatably connects to the frame or chassis 110 at one end and rotatably connects to the left lower control arm 138 at the other end. The first or right cylinder 142 extends and retracts allowing the right wheel hub 112 to move or travel vertically, up-and-down, relative to the frame or chassis 110. The second or left cylinder 144 extends and retracts allowing the left wheel hub 114 to move or travel vertically, up-and-down, relative to the frame or chassis 110.

With reference to FIGS. 4-10, a suspension system 140 includes a first cylinder 142, a second cylinder 144, and a hydraulic source 150, for example a hydraulic pump, providing fluid flow throughout the suspension system 140. A first proportional valve 152 selectively connects one or more accumulators 156 to the piston sides of the first and second cylinders 142, 144. The first proportional valve 152 selectively allows and prevents fluid flow between the one or more accumulators 156, the piston side of the first cylinder 142, and the piston side of the second cylinder 144. The first proportional valve 152 can be a two-position proportional valve. In a first position, the first proportional valve 152 allows flow between the one or more accumulators 156 and the piston sides of both the first and second cylinders 142, 144. In a second position, the first proportional valve 152 prevents the flow between the one or more accumulators 156 and the piston sides of both the first and second cylinders 142, 144. The first proportional valve 152 can be pilot operated or solenoid operated. The first proportional valve 152 can include a spring 172 with a first spring rate or spring constant K1, which provides or exerts a force on the first proportional valve 152 towards the first position.

A second proportional valve 154 selectively connects a first accumulator 162 to the piston side of the first cylinder 142 and selectively connects a second accumulator 164 to the piston side of the second cylinder 144. The second proportional valve 154 selectively allows and prevents flow between the first accumulator 162 and the piston side of the first cylinder 142 and between the second accumulator 164 and the piston side of the second cylinder 144. The second proportional valve 154 can be a two-position proportional valve, as shown for example in FIGS. 4-8. In a first position, the second proportional valve 154 allows flow between the first accumulator 162 and the piston side of the first cylinder 142 and between the second accumulator 164 and the piston side of the second cylinder 144. In a second position, the second proportional valve 154 prevents the flow between the first accumulator 162 and the piston side of the first cylinder 142 and between the second accumulator 164 and the piston side of the second cylinder 144. Alternatively, the second proportional valve 154 can be a three-position proportional valve, as shown for example in FIGS. 9-10. In a third position, the second proportional valve 154 allows flow between the piston sides of first and second cylinders 142, 144 while preventing the flow between the first accumulator 162 and the piston side of the first cylinder 142 and preventing the flow between the second accumulator 164 and the piston side of the second cylinder 144. The second proportional valve 154 can be pilot operated or solenoid operated. The second proportional valve 154 can include a spring 174 with a second spring rate or spring constant K2, which provides or exerts a force on the second proportional valve towards the first position.

A valve 158 (e.g., pilot pressure control valve) can provide pressure for the pilot operation of the first and second proportional valves 152, 154. The valve 158 can be a single valve providing pilot pressure to both the first and second proportional valves 152, 154. The valve 158 is connected to the hydraulic pump 150. Alternatively, the valve 158 can be a plurality of valves with one valve providing pilot pressure to the first proportional valve 152 and a second valve providing pilot pressure the second proportional valve 154. Alternatively, the first and second proportional valves 152, 154 can each be solenoid operated.

A valve 160 can selectively connect the hydraulic pump 150 to the first proportional valve 152, which selectively connects to the piston sides of the first and second cylinders 142, 144, as shown for example in FIGS. 4-8, to extend the first and second cylinders 142, 144. In a first position, the valve 160 allows flow from the hydraulic pump 160 to the first proportional valve 152. In a second position, the valve 160 prevents flow from the hydraulic pump 160 to the first proportional valve 152. Alternatively, the valve 160 can selectively connect the hydraulic pump 150 to the first cylinder 142, as shown for example in FIGS. 9-10. When the second proportional valve 154 is in the third position, the valve 160 can selectively connect the hydraulic pump 150 to the piston sides of the first and second cylinders 142, 144, as shown for example in FIGS. 9-10. Extending the first and second cylinders 142, 144 raises the suspension system 140.

A valve 166 can selectively connect a hydraulic sump to the first proportional valve 152, which selectively connects to the piston sides of the first and second cylinders 142, 144, as shown for example in FIGS. 4-8, to retract the first and second cylinders 142, 144. In a first position, the valve 166 allows flow from the first proportional valve 152 to the hydraulic sump. In a second position, the valve 166 prevents flow from the first proportional valve 152 to the hydraulic sump. Alternatively, the valve 166 can selectively connect the hydraulic sump to the first cylinder 142, as shown for example in FIGS. 9-10. When the second proportional valve 154 is in the third position, the valve 166 can selectively connect the hydraulic sump to the piston sides of the first and second cylinders 142, 144, as shown for example in FIGS. 9-10. Retracting the first and second cylinders 142, 144 lowers the suspension system 140.

The rod sides of the first and second cylinders 142, 144 can be connected to each other and to an accumulator 180, as shown for example in FIGS. 4, 6, 9, and 10. A valve 182 can selectively connect the hydraulic pump 150 to the accumulator 180 and the rod sides of the first and second cylinders 142, 144. A valve 184 can selectively connect a hydraulic sump to the accumulator 180 and the rod sides of the first and second cylinders 142, 144.

The valve 158 controls the amount of pilot pressure provided to the first and second proportional valves 152, 154. As the pilot pressure provided by valve 158 increases, the first proportional valve 152 begins to move from the first position towards the second position against the force of the spring 172, which reduces the flow through the first proportional valve 152. As the pilot pressure continues to increase, the first proportional valve 152 continues reducing the flow until the first proportional valve 152 is in the second position, which prevents flow between the first and second cylinders 142, 144 and the one or more accumulators 156.

As the pilot pressure provided by valve 158 increases, the second proportional valve 154 begins to move from the first position towards the second position against the force of the spring 174, which reduces the flow through the second proportional valve 154. As the pilot pressure continues to increase, the second proportional valve 154 continues reducing the flow until the second proportional valve 152 is in the second position, which prevents the flow between the first accumulator 162 and the piston side of the first cylinder 142 and between the second accumulator 164 and the piston side of the second cylinder 144. If the second proportional valve 154 includes a third position, increasing the pilot pressure continues to move the second proportional valve 154 from the second position towards the third position, which allows flow between the first and second cylinders 142, 144, while still preventing flow to and from the first and second accumulators 162, 164.

The first spring constant K1 and the second spring constant K2 can be the same or different. The first spring constant K1 can be less than, greater than, or equal to the second spring constant K2. When the first spring constant K1 is less than the second spring constant K2, the pilot pressure can cause the first proportional valve 152 to move from the first position towards the second position before the second proportional valve 154 begins to move. The first and second spring constants K1, K2 can be selected to achieve a desired amount of relative movement between the first proportional valve 152 and the second proportional valve 154 when the pilot pressure is applied.

The suspension system 140 can have varying levels of damping or stiffness for the roll motion and the heave motion based on the positions of the first and second proportional valves 152, 154.

When both the first and second proportional valves 152, 154 are in their respective first or open positions, the first and second cylinders 142, 144 are in fluid communication with each other, with the one or more accumulators 156, and with the first and second accumulators 162, 164.

When the first proportional valve 152 is in the second or closed position and the second proportional valve 154 is in the first or open position, the first cylinder 142 is in fluid communication with the first accumulator 162, and the second cylinder 144 is in fluid communication with the second accumulator 164, but the first and second cylinders 142, 144 are fluidly isolated from each other and from the one or more accumulators 156.

When both the first and second proportional valves 152, 154 are in their respective second or closed positions, the first and second cylinders 142, 144 are fluidly isolated from each other, from the one or more accumulators 156, and the first and second accumulators 162, 164.

When the first proportional valve 152 is in the second or closed position and the second proportional valve 154 is in the third position, the first and second cylinders 142, 144 are in fluid communication with each, but are fluidly isolated from the one or more accumulators 156 and the first and second accumulators 162, 164.

When the first proportional valve 152 is in the first or open position and the second proportional valve 154 is in the third position, the first and second cylinders 142, 144 are in fluid communication with each other and with the one or more accumulators 156, but are fluidly isolated from the first and second accumulators 162, 164.

When the first proportional valve 152 is in the first or open position and the second proportional valve 154 is in the second or closed position, the first and second cylinders 142, 144 are in fluid communication with each other and with the one or more accumulators 156, but are fluidly isolated from the first and second accumulators 162, 164.

An electronic control unit or controller 200 can have one or more microprocessor-based electronic control units or controllers, which perform calculations and comparisons and execute instructions, for example algorithms. The controller 200 includes a processor, a core, volatile and non-volatile memory, digital and analog inputs, and digital and analog outputs. The controller 200 can include non-transitory, computer readable memory, which includes instructions for execution by the processor, for example algorithms. The controller 200 connects to and communicates with various input and output devices. The controller 200 receives communications or signals from one or more devices, determines an appropriate response or action, and sends communications or signals to one or more devices.

The controller 200 connects to and communicates with the suspension system 140, including the various components of the hydraulic system. The controller 200 can communicate with the valve 158 to adjust the pilot pressure provided to the first and second proportional valves 152, 154, which opens or closes the first and second proportional valves 152, 154 to vary the damping or stiffness of the suspension system 140 (e.g., roll damping or stiffness, heave damping or stiffness, etc.). Alternatively, or additionally, the controller 200 can communicate with the first and second proportional valves 152, 154 to adjust the position of the first and second proportional valves 152, 154, which varies the damping or stiffness of the suspension system 140. The controller 200 can open the valve 158 to increase the pilot pressure causing one or more of the first and second proportional valves 152, 154 to partially or fully close.

Figure 11:
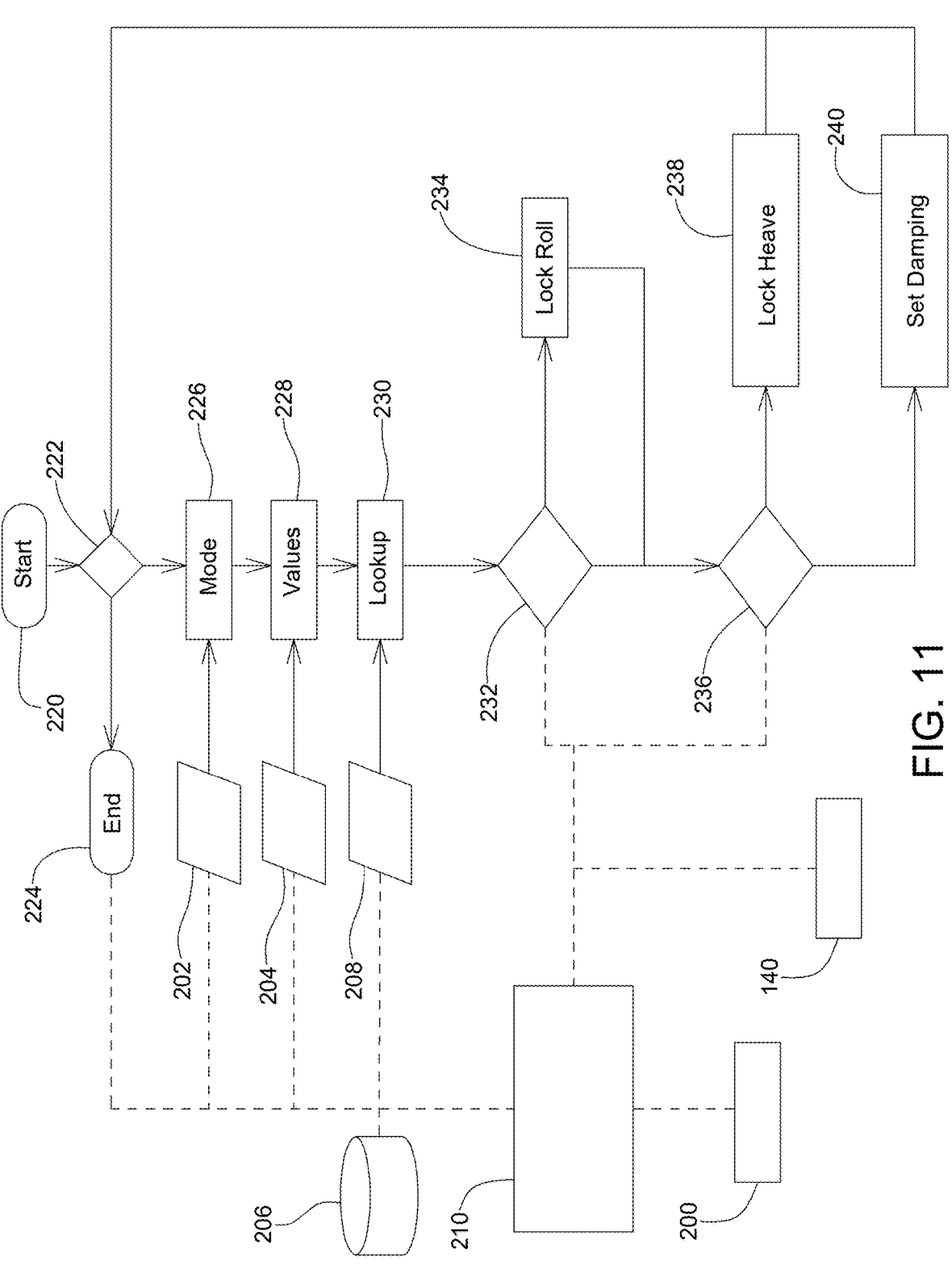
FIG. 11 is a system and process flow diagram of a suspension system for a work vehicle, according to an implementation.

With reference to FIG. 11, the controller 200 can determine the suspension mode of the work vehicle 100. For example, the work vehicle can have a manual mode, a max mode, and an auto mode. In the manual mode, an operator of the work vehicle 100 can provide input to the controller 200 to raise the suspension system 140 via the valve 160 and lower the suspension system 140 via the valve 166. In the max mode, the controller 200 can close the first proportional valve 152 and partially close the second proportional valve 154 to provide an increased or elevated level of damping in the suspension system 140. In the auto mode, the controller 200 varies the damping of the suspension system 140 by adjusting the first and second proportional valves 152, 154 based on one or more tractor values. The controller 200 can determine the tractor values, including the operational status or condition of the suspension system 140 and the various other systems of the work vehicle 100 (e.g., vehicle speed, vehicle acceleration, turning radius, wheel angle, hitch position, hitch status, drawbar pull or load, transmission gear, transmission shift status, engine speed, engine load, brake engagement status, slope, terrain, yaw motion, pitch motion, roll motion, heave motion, etc.).

The controller 200 can determine the damping value or roll stiffness based on the suspension mode and the tractor values. The controller 200 can use a lookup table in a local or remote database 206 to determine the damping value or roll stiffness based on the suspension mode and the tractor values. The controller 200 can determine whether to reduce or prevent the roll motion (e.g., left and right motion). For example, the controller 200 can partially close or fully close the first proportional valve 152 to reduce or prevent the roll motion. The controller 200 can determine whether to reduce or prevent the heave motion (e.g., vertical or up-and-down motion). For example, the controller 200 can partially or fully close the first and second proportional valves 152, 154 to reduce or prevent the heave motion. The controller 200 can determine to partially or fully close the first proportional valve 152 first and then partially or fully close the second proportional valve 154.

The controller 200 can connect to and communicate with an electronic control system 210 of the work vehicle 100, which connects to and communicates with the various systems of the work vehicle 100 including the suspension system 140. The electronic control system 210 can connect to and communicate with various sensors and other electronic devices to detect or sense the tractor values (e.g., wheel speed sensor, wheel angle sensor, engine speed sensor, engine load sensor, hitch position sensor, drawbar load sensor, transmission speed sensor, transmission gear sensor, acceleration sensor, pitch sensor, roll sensor, yaw sensor, brake sensor, GPS sensor or unit, engine controller, transmission controller, etc.). The electronic control system 210 can include a data bus such as a controller area network bus (CAN bus). The controller 200 is configured to execute instructions (e.g., algorithms) varying the damping or stiffness of a suspension system 140 for a work vehicle 100.

According to some implementations, at 220, the controller 200 is configured to start the process or method for varying the damping of a suspension system 140 for a work vehicle 100.

At 222, the controller determines an operational status of the work vehicle 100 based on communication with the electronic control system 210.

If the work vehicle 100 is not running or is non-operational, then the controller 200 ends the process or method at 224.

If the work vehicle 100 is running or operational, then at 226 the controller 200 determines the suspension mode of the work vehicle 100 based on an input 202 from the electronic control system 210.

At 228, the controller 200 determines one or more tractor values of the work vehicle 100 based on an input 204 from the electronic control system 210.

At 230, the controller retrieves a lookup value 208 for the damping or roll stiffness from a local or remote database 206 based on the suspension mode and the tractor values. The lookup value 208 can include the settings or positions for the first and second proportional valves 152, 154, and can include other values, settings, or instructions for the suspension system 140.

At 232, the controller 200 determines whether to lock the roll motion based on the lookup value 208. If the controller 200 determines to lock the roll motion, then at 234 the controller 200 adjusts the first proportional valve 152 to the closed position before continuing to 236. If the controller 200 determines not to lock the roll motion, then the process continues to 236.

At 236 the controller 200 determines whether to lock the heave motion based on the lookup value 208. If the controller 200 determines to lock the heave motion, then at 238 the controller 200 adjusts the first proportional valve 152 to the closed position and the second proportional valve 154 to the closed position. Alternatively, if the controller 200 determines to lock the heave motion, then at 238 the controller 200 adjusts the first proportional valve 152 to the closed position and the second proportional valve 154 to the third position, allowing flow between the piston sides of first and second cylinders 142, 144 while preventing the flow to and from the first and second accumulators 162, 164. After the controller 200 locks the heave motion at 238, then the controller 200 returns to 222 to determine the operational status of the work vehicle 100.

If the controller 200 determines not to lock the heave motion, then at 240 the controller 200 determines the settings or positions of the first and second proportional valves 152, 154 based on the lookup value 208. For example, the controller 200 can determine the amount of pilot pressure to provide to the first and second proportional control valves 152, 154 by determining the position of the pilot pressure control valve 158. The controller 200 sets or positions the first and second proportional valves 152, 154 based on the lookup value 208.

The controller 200 then returns to 222 to determine the operational status of the work vehicle 100. In other implementations, one or more of these steps, processes, or operations may be omitted, repeated, re-ordered, combined, or separated and are within the scope of the present disclosure.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A suspension system for a work vehicle, comprising:
a first cylinder having a piston side and a rod side, the first cylinder connected between a chassis and an axle assembly on a right side of the work vehicle;
a second cylinder having a piston side and a rod side, the second cylinder connected between the chassis and the axle assembly on a left side of the work vehicle;
a first proportional valve having a first position allowing flow between one or more accumulators, the piston side of the first cylinder, and the piston side of the second cylinder, and a second position preventing flow between the one or more accumulators, the piston side of the first cylinder, and the piston side of the second cylinder; and
a second proportional valve having a first position allowing flow between a first accumulator and the piston side of the first cylinder and allowing flow between a second accumulator and the piston side of the second cylinder, and a second position preventing flow between the first accumulator and the piston side of the first cylinder and preventing flow between the second accumulator and the piston side of the second cylinder.

2. The suspension system of claim 1, further comprising:
a valve selectively providing pilot pressure to the first and second proportional valves.

3. The suspension system of claim 2, wherein the first proportional valve includes a first spring having a first spring constant providing a force on the first proportional valve towards the first position.

4. The suspension system of claim 3, wherein the second proportional valve includes a second spring having a second spring constant providing a force on the second proportional valve towards the first position.

5. The suspension system of claim 4, wherein the first spring constant is less than the second spring constant, such that the pilot pressure causes the first proportional valve to move towards the second position before the second proportional valve.

6. The suspension system of claim 1, wherein the second proportional valve has a third position allowing flow between the piston sides of first and second cylinders, preventing flow between the first accumulator and the piston side of the first cylinder, and preventing flow between the second accumulator and the piston side of the second cylinder.

7. The suspension system of claim 1, wherein the rod sides of the first and second cylinders are connected to each other and to a third accumulator.

8. A system for varying the damping of a suspension system for a work vehicle, comprising:

a first cylinder having a piston side and a rod side, the first cylinder connected between a chassis and an axle assembly on a right side of the work vehicle;

a second cylinder having a piston side and a rod side, the second cylinder connected between the chassis and the axle assembly on a left side of the work vehicle;

a first proportional valve having a first position allowing flow between one or more accumulators, the piston side of the first cylinder, and the piston side of the second cylinder, and a second position preventing flow between the one or more accumulators, the piston side of the first cylinder, and the piston side of the second cylinder;

a second proportional valve having a first position allowing flow between a first accumulator and the piston side of the first cylinder and allowing flow between a second accumulator and the piston side of the second cylinder, and a second position preventing flow between the first accumulator and the piston side of the first cylinder and preventing flow between the second accumulator and the piston side of the second cylinder; and a controller configured to vary the damping of the suspension system by adjusting pilot pressure provided to the first and second proportional valves.

9. The system of claim 8, further comprising:

a valve selectively providing pilot pressure to the first and second proportional valves, the controller configured to adjust the valve varying the pilot pressure provided to the first and second proportional valves.

10. The system of claim 9, wherein the first proportional valve includes a first spring having a first spring constant providing a force on the first proportional valve towards the first position.

11. The system of claim 10, wherein the second proportional valve includes a second spring having a second spring constant providing a force on the second proportional valve towards the first position.

12. The system of claim 11, wherein the first spring constant is less than the second spring constant, such that the pilot pressure causes the first proportional valve to move towards the second position before the second proportional valve.

13. The system of claim 8, wherein the second proportional valve has a third position allowing flow between the piston sides of first and second cylinders, preventing flow between the first accumulator and the piston side of the first cylinder, and preventing flow between the second accumulator and the piston side of the second cylinder.

14. The system of claim 8, wherein the rod sides of the first and second cylinders are connected to each other and to a third accumulator.

15. The system of claim 9, wherein the controller is configured to adjust the valve varying the pilot pressure provided to the first and second proportional valves to close the first proportional valve and partially close the second proportional valve.

16. The system of claim 9, wherein the controller is configured to adjust the valve varying the pilot pressure provided to the first and second proportional valves to close the first and second proportional valves.

* * * * *